Sept. 12, 1944.  A. LENHARDT  2,357,900
SCARECROW FOR GARDENS AND THE LIKE
Filed Aug. 3, 1943
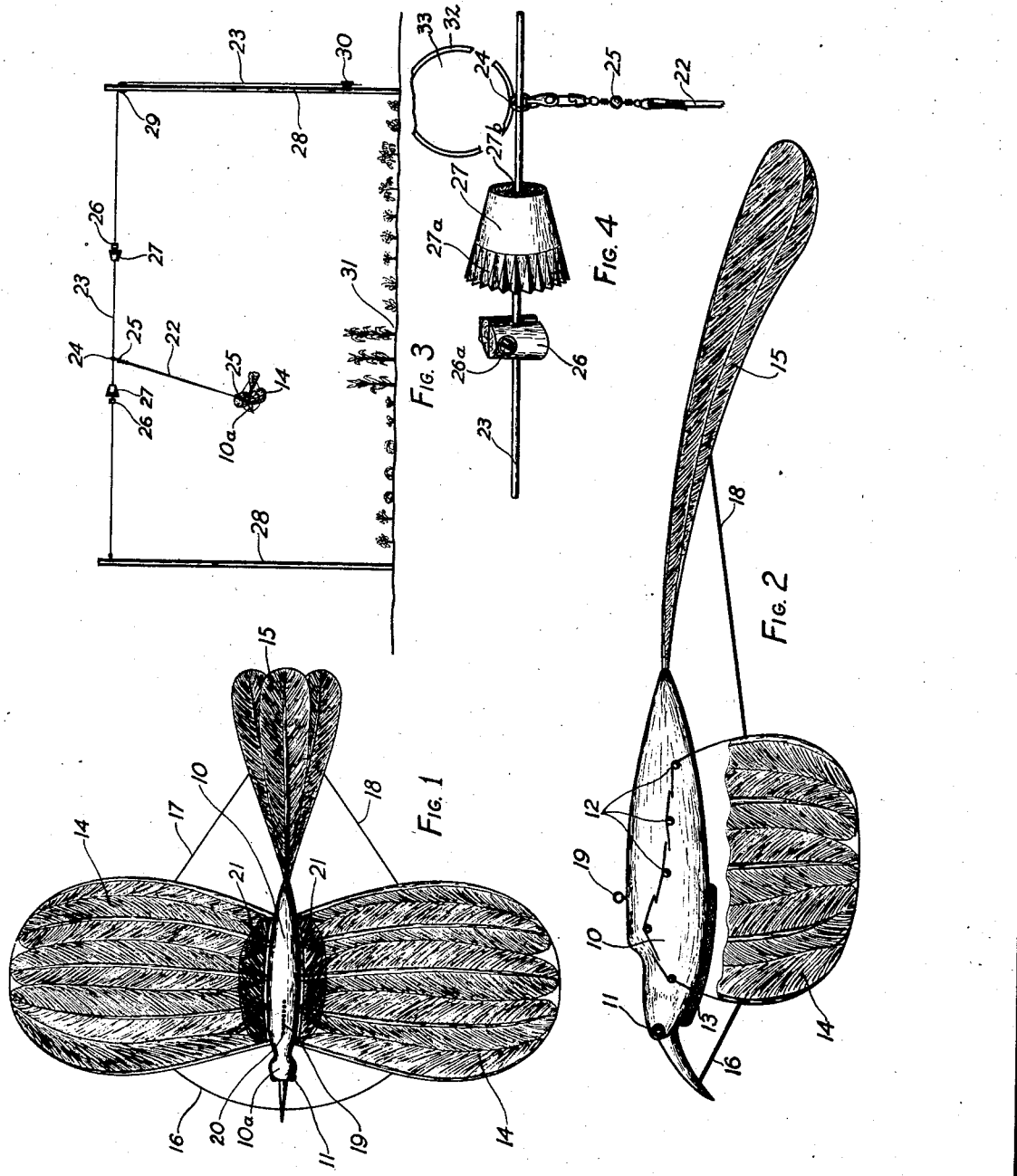
ALEXANDER LENHARDT
INVENTOR.
BY Ray Belmont Whitman
ATTORNEY Patented Sept. 12, 1944

2,357,900

UNITED STATES PATENT OFFICE 2,357,900

SCARECROW FOR GARDENS AND THE LIKE

Alexander Lenhardt, Monterey, Calif.

Application August 3, 1943, Serial No. 497,246

3 Claims. (Cl. 46—77)

This invention relates to means for preventing destruction by pests of gardens and the like, and more especially to a scarecrow for frightening away birds and other destructive animals.

An object of the invention is to provide simple effective means for preventing the destruction of sprouting seeds, small and large plants, berries, fruits, and other growing things in gardens and orchards, by birds or other plant-destroying animals.

Another object is to provide a method and means of scaring off such destructive animals through realistic simulation and flight of a natural enemy of said animals, made to continuously fly low over the ground to be protected.

A further object is to provide such a device with means permitting it to be readily put up when the need for such protection exists, and taken down when the period of possible destruction passes—as at the close of the early growing season.

A still further object is to provide such a device with means for maintaining its effectiveness both during periods of little or no breeze and also during high winds.

Yet another object is to provide readily-arranged means for extending this protection over very small gardens or like areas as well as over very large spaces.

Finally, an object is to provide such a device which is always overhead and out of reach, needs no attention, is durable, sightly, commands the absorbing interest of persons viewing it in operation, and which will resist the destructive action of the elements over long intervals.

All these and other objects, as suggested herebelow, are attained by the method and means now to be described, and illustrated in the accompanying drawing, in which—

Figure 1 is a top plan view of a preferred embodiment of the main operating unit, or hawk, of the invention.

Fig. 2 is a longitudinal side elevational view, partly cut-away, of the device of Fig. 1.

Fig. 3 is a side elevational view of the device of Fig. 1 in operative relation with the other essential elements of the invention, showing its preferable erection and use over a garden to be protected.

And Fig. 4 is an enlarged detail perspective view of the holding wire, end stop, anti-tangler, swivel traveler, and hawk-supporting band—all comprising essential parts of the invention in toto.

Like numerals refer to like parts throughout the several views.

The realistically-simulated chicken hawk, Figs. 1 and 2, comprises a shaped and stream-lined body portion 10, complete with a beak and artificial eyes 11. This body 10 may be formed from wood, plastic, or like suitable material; and the eyes 11 may employ glass, mirrors, radium, or other light-reflecting means to enhance their visibility after dark. It is understood, of course, that this whole body will be of a color or textural appearance to best simulate the natural body of its prototype, the chicken hawk, or in fact, any other bird or object which would be most effective under the particular circumstances of installation.

A balance weight 13, preferably of lead or other heavy metal, is attached to body 10 at its under forward portion, being stream-lined along the body and so positioned with respect to the center of gravity of the entire bird and wings as to most effectually maintain it in most natural balanced flight, including realistic soaring, dipping, bobbing, fluttering, banking, circling, diving, etc.

An eye screw or suspending hook 19 is secured in one of a plurality of longitudinally-positioned holes 20, Fig. 1, along the upper center line of the body 10, for the purpose of permitting its suspension at several different fore-and-aft slants, as experiment may determine most effective for the varied conditions encountered in a given installation.

Some five small holes 12, Fig. 2, positioned about as shown, extend laterally into body 10 from each of its sides, and into these are inserted the quill ends of as many feathers—preferably turkey feathers, which at present seem to be the most practical realistic-of-the-hawk feathers to use. These feathers are numbered 14, and it will be noted that about half of the two front and two rear feathers have had their feathery parts trimmed down to the quill, which is thus used as the leading and following edge of the side wings of the bird so formed. Partial turkey feathers 21 are preferably secured, as by gluing, in fore-and-aft relation across the inner ends of the wing feathers 14, adjacent body 10, to cover the normal openings in the wing feathers and build a solid wing for maximum support of the bird in flight.

With the second from the front feathers positioned somewhat above the line of the others, the side wings are provided with a camber, or dished downwardly, to simulate the efficiency of the bird's or airplane's wings, and make for effortless sustained flight even in the gentlest breeze.

Projecting rearwardly from the rear apex of body 10 are some three similar feathers 15, the middle one overlying the others from above, and the side feathers remaining untrimmed at the quill. These feathers are positioned as shown to expand outwardly toward the rear, and are crowned or concaved from below, when considered in lateral cross section, to improve the flying and maneuvering of the bird. Bracing wires 17, 18 add strength and ruggedness by tying tail 15 to side wings 14; and another like wire 16 connects the fronts of the side wings 14, and extends through an opening in the bird's beak, as shown.

The complete hawk is suspended from above by attaching to its hook 19, Fig. 2, a swivel member 25, Fig. 3, and which is shown more in detail in Fig. 4. Member 25 may be similar to swivels used by fishermen on their hand fishing lines, employing a simple ball-and-socket or like principle. And said swivel 25 is attached to the lower end of a resilient rubber band 22, preferably tapered with its smaller end supporting the hawk, for greater flexibility of movement of the bird in flight. Another like swivel 25, Fig. 4, connects the upper end of band 22 to a traveler 24, which may be preferably a wire ring having an opening amply larger than the diameter of the supporting wire 23. Secured to the top of traveler 24, and sometimes positioned at right angles to the direction of the wire 23, is a wire ring 32, acting as a frame for a Cellophane sail 33, to take up the strain and sag on supporting wire 23 when the hawk is in motion below the wire, especially in a heavy wind; it also facilitates more easy sliding of the hawk back and forth along said wire, in any air movement.

Wire 23 is suspended over the garden 31, Fig. 3, or other area to be protected, as by posts 28, 28, preferably spaced diagonally across the area, and of substantial height. One end of the wire is attached near the top of one post, brought across to a pulley 29 attached to the top of the other post, then down that post to a cleat 30 at convenient reachable height, for tightening the said wire.

Stops 26, 26 are attached to wire 23 somewhat away from each post, as shown, and these may consist of a split member 26, Fig. 4, with a screw 26a to clamp it where desired on the wire. An anti-tangler 27, Fig. 4, comprises a truncated cone shaped member of wood, for instance, having a large hole 27b to easily slide along the wire 23, its larger end being fluted or serrated, somewhat as shown, to catch the band 22 in a flute and keep it from winding around the wire 23 when the hawk is circling the wire, as during a brisk wind.

This unique device, when properly installed, so closely imitates the flight and actions of birds' natural enemy, the chicken hawk, as to scare away permanently all birds; it has also kept cotton tail and jack rabbits away. While it is primarily dependent upon a breeze for its imitating action, yet when the air is relatively still, it will agitate itself and twist around. It has withstood squalls up to 45 miles an hour. In strong winds the hawk goes over the wire, coming down in sweeping dives, the rubber band suspension giving elasticity and resiliency. It also slides along the wire between stops, aided in this respect by its sail 33. The wire, of course, is erected in a horizontal or level position, and it is best placed crosswise to the prevailing winds. In small gardens, the stops 26 may be only a few feet apart. They are adjustable along the wire for larger gardens, as explained. The hawk is preferably suspended at least 6½ feet above the ground in the smaller gardens, and at least four lengths of the band 22 from any object, such as trees, shrubbery, buildings, or fences, and also out of reach of pets and children. Where high installation is needed, and using eight feet or more of band 22, the hawk should be at least ten feet above the ground. For protecting seed beds and open cold frames, a band 3½ to 5 feet long may be used, the hawk being maybe five feet above the ground, and the stops only a few feet apart.

Wires 16, 17, 18 not only brace the hawk but prevent it tangling on wire 23. Weight 13 also brings center of gravity of hawk low, to keep it stable or suspended in upright position.

Having now described the invention, what is claimed as new, and for which Letters Patent of the United States is desired, is:

1. A scarecrow comprising a bird-like member, a raised horizontal wire, and flexible suspending means slidable along the wire and affixed to said member to suspend it therebelow, the wire being unsupported except near its ends, and provided with anti-tangling means adapted to prevent tangling of the flexible means with the supports.

2. Anti-tangling means for a wire-supported scarecrow-suspension cord adapted to rotate around the wire, comprising a somewhat-conical-shaped fluted member slidable and rotatable on said wire, and adapted to prevent the cord from tangling in the wire end supports.

3. In combination, a flyable bird-like scarecrow, a flexible cord suspending it from above, a horizontal wire, and means adapted to slidably connect the cord to the wire, including sail-like means affixed to said connecting means to assist in movement of the scarecrow along the wire through movement of the surrounding air.

ALEXANDER LENHARDT.